| United States Patent [19] | [11] Patent Number: 4,746,552 |
| Tokumoto et al. | [45] Date of Patent: May 24, 1988 |

[54] METHOD OF FINISHING A CONCRETE STRUCTURE

[75] Inventors: Minoru Tokumoto, Ikomagun; Motoyuki Takagi, Osaka, both of Japan

[73] Assignee: National Starch and Chemical Corporation, Bridgewater, N.J.

[21] Appl. No.: 61,843

[22] Filed: Jun. 11, 1987

[30] Foreign Application Priority Data

Jun. 25, 1987 [JP] Japan ................... 61-151919

[51] Int. Cl.$^4$ .................................... B05D 3/02
[52] U.S. Cl. .................... 427/393.6; 427/403; 427/407.1
[58] Field of Search ............... 427/393.6, 403, 407.1

Primary Examiner—Norman Morgenstern

[57] ABSTRACT

A method of finishing a concrete structure which comprises coating an aqueous acrylic acid esters resin emulsion including a special acrylic acid esters copolymer on the bare surface of a concrete structure and after dried, forming a cement-based finishing layer. The action of the film formed by said emulsion provides an improved adhesive bond strength between said concrete structure and the finishing layer, prevents breakage of the finishing layer almost permanently, and is, furthermore, effective in bonding the coated layers strongly, even when they are coated repeatedly.

4 Claims, No Drawings

METHOD OF FINISHING A CONCRETE STRUCTURE

BACKGROUND OF THE INVENTION

1. Field of the Invention

The present invention relates to a method of finishing a concrete structure which comprises using a special aqueous acrylic acid ester resin emulsion to adhieve an imporved adhesive bond strength between the concrete structure and a finish layer.

2. Description of the Prior Art

In applying a cement-based finish layer such as cement motar to the bare surface of a concrete structure made of, say, concrete or lightweight concrete, attempts have been made to achieve an improved adhesive bond stength between the substrate surface and the cement-based finish layer by coating the substrate concrete surface with an aqueous synthetic resin emulsion adhesive beforehand and, after drying, applying a cement-based finishing material on top of the adhesive layer [Japanese Patent Publication Nos. 37832/1985 and 42828/1985]. The art described in the above patent publication No. 37832/1985 employs an aqueous emulsion of acrylic ester-styrene copolymer or ethylene-vinyl acetate copolymer as an adhesive agent with hopes of improving the antiquake adhesive bond strength but such adhesive does not provide a sufficient durability bond strength (weather-resisting bond strength) nor does it ensure a sufficient heat-resisting bond strength (bond strength at elevated temperature). Furthermore, in multi-layer coating (when a second or subsequent coat is further applied to a dried previous coat), marked reductions are encountered in the room temperature bond strength, heat-resisting bond strength and durability bond strength across the interface between the two coating lamellae.

In the method described in Japanese Patent Publication No. 42828/1985, a vinyl resin emulsion containing an epoxy resin component and an epoxy curing agent is used as an adhesive to improve the initial adhesive bond strength but since this adhesive composition has only a short pot life, it has the inconvenience that the two components must be mixed immediately before use. Moreover, it has the disadvantage that the bonding performance deteriorates with time after mixing. Furthermore, as the vinyl resin in the resin emulsion has no crosslinkable functional group within its molecule, it cannot provide a crosslinked structure, so that the composition does not provide a sufficient heat-resisting adhesive bond strength.

Aside from the foregoing methods comprising applying a cement-based finish layer onto the bare surface of a concrete structure, a method comprising laminating a high polymer sheet with the concrete surface of a substrate structure has been disclosed in Japanese Laid-Open Patent Application Kokai No. 129280/1984. In this method, an emulsion adhesive is coated on the concrete surface and before the resulting film dries, said high polymer sheet is superimposed so as to provide an integral unit. The emulsion adhesive used in this method is an acryl-crosslinkable emulsion adhesive such as a (meth)acryl ester-glycidyl methacrylate copolymer emulsion. This emulsion adhesive is characterized in that because the presence of a high polymer sheet on top of its layer, it attracts the alkali component of concrete composition from the concrete surface on account of its own moisture and is thereby crosslinked and cured to display an adhesive bond strength. Therefore, it has the advantage that the decrease in bond strength due to temperature increase is prevented. However, the above emulsion adhesive is so low in reactivity that when coated on the surface of alkali-lean foamed or autoclaved lightweight concrete (hereinafter referred to briefly as ALC) or an aged concrete structure whose surface has been neutralized, it does not undergo sufficient alkali crosslinking, so that no sufficient adhesive effect can be accomplished. Moreover, the above alkali-crosslinkable emulsion adhesive shows a marked decrease in alkali crosslinking rate in dry condition, it cannot display a sufficient adhesive power when used in lieu of the adhesive used in the method of Japanese Patent Publication No. 37832/1985 or No. 42828/1985. Thus, the method proposed in the above patent literature comprises coating an adhesive on the surface of a concrete structure and after the adhesive layer has dried, applying a cement-based finish material and if the above emulsion adhesive incapable of alkali crosslinking in dry state is employed in this technique, no adequate adhesive bond strength develops because of insufficient crosslinking, so that no sufficient bond can be established between the concrete structure and the cement-based finish.

Although a variety of methods have been proposed, as mentioned above, for attaining an improved adhesive bond between the concrete-based structure and the cement-based finish layer, there is not known, and a keen demand exists for, a method conducive to safisfactory results in all of heat-resisting bond strength, durability bond strength and atmospheric temperature bond strength and free of the problem of decreased adhesive bond strength in multiple-layer coating.

Accomplished under the situation summarized above, the present invention has as its object to provide a method of finishing a concrete structure which is conducive to improved heat-resisting bond strength, durability bond strength and atmospheric temperature bond strength and free of the problem of decreased bond strength in multiple-layer coating.

SUMMARY OF THE INVENTION

Intended to accomplish the above-mentioned object, the method of finishing a concrete structure according to the present invention comprises coating an aqueous synthetic resin emulsion on the bare surface of a concrete structure and after the film formed by said emulsion has substantially dried, forming a cement-based finish layer predominantly made up of cement and water on top of the dried emulsion film, said aqueous synthetic resin emulsion being an aqueous acrylic ester type resin emulsion based on the following acrylic ester copolymer (A).

(A) An acrylic ester copolymer comprising either one or both of a repeating unit of general formula (1) and a repeating unit of general formula (2) and a repeating unit of general formula (3) said copolymer having a glass transition point in the range of $-10°$ C. to $20°$ C.

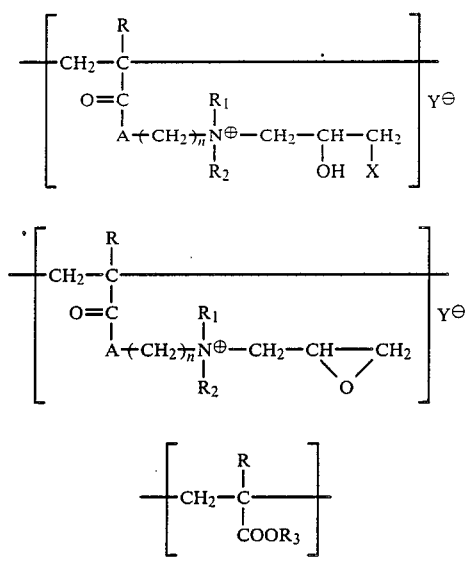

(1)

(2)

(3)

In the formulas (1) through (3), R means a hydrogen atom or a methyl group; $R_1$ and $R_2$ each means a methyl group or an ethyl group and may be the same or different; $R_3$ means an alkyl group of 1 to 12 carbon atoms or a cycloalkyl group; A means —O— or —NH—; X means chlorine, bromine or iodine; Y means an organic or inorganic anion; and n is equal to 2 or 3.

DETAILED DESCRIPTION OF THE INVENTION

Thus, in accordance with the present invention, an aqueous emulsion of the above-defined special acrylic ester resin is employed to improve the adhesive bond strength between said concrete structure and finish. This acrylic ester resin is particulate and, because of its quaternary ammonium group, is cationic, so that when applied to the bare surface of a concrete structure, it is efficiently adsorbed on the anionic concrete surface and, upon drying (inclusive of semi-dry state), forms a tough film intimately adherent to the concrete surface. Then, as a cement-based finishing material (for example, raw mortar) based on cement and water is applied on top of the above resin film, the anionic cement particles in the finishing material are electrically attracted to the cationic resin film surface and, at the same time, the alkali and water contained in the finishing material penetrate into the resin film to swell it. Furthermore, said alkali acts on the crosslinkable functional group

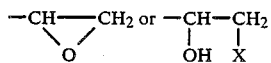

present on the surface of acrylic ester resin particles and in the acrylic ester resin film to trigger crosslinking, thereby forming bridges between resin molecules, between resin particles and between resin films (in multiple-layer coating) and, hence, rendering the resin film highly resistant to heat and water and tough. And this tough resin film has been tightly bound to the underlying concrete structure and the superimposed cement-based finish layer by an adhesive force, the main component of which is an electrical attraction force. This is why the present invention brings about very remarkable improvements in heat-resisting bond strength, durability bond strength, and atmospheric temperature bond strength. Furthermore, even in multiple-layer coating with the resin emulsion, interlamellar crosslinking takes place between the resin layers, with the result that the long-standing problem of decreased bond strength in multiple-layer coating is eliminated.

Thus, the most outstanding feature of the present invention lies in the fact that, as mentioned above, said excellent effects are achieved by improving the bond strength by way of electrical attraction, in the main, plus chemical crosslinking through the use of an aqueous emulsion containing a special acrylic ester resin based on the aforementioned repeating units.

The aqueous emulsion of acrylic ester resin having the above-mentioned repeating units can be manufactured from one or more monomeric alkyl acrylates or methacrylates containing an alkyl group of 1 to 12 carbon atoms or a cycloalkyl group and one or more alkali-crosslinkable monomeric quaternary ammonium salts of the following general formula (4) and/or (5) by the conventional procedure for the production of aqueous acrylic ester resin emulsions.

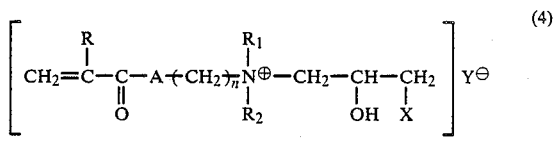

(4)

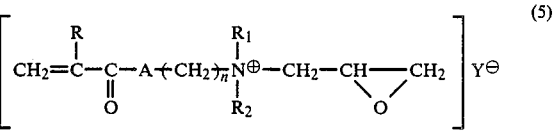

(5)

In the above general formulas (4) and (5), R, $R_1$, $R_2$, A, Y and n have the same meanings as defined in the general formulas (1) and (2).

The alkyl acrylates or alkyl methacrylates which contain an alkyl group of 1 to 12 carbon atoms or a cycloalkyl group include, for example, methyl acrylate, ethyl acrylate, propyl acrylate, butyl acrylate, amyl acrylate, hexyl acrylate, 2-ethylhexyl acrylate, n-octyl acrylate, decyl acrylate, lauryl acrylate, cyclohexyl acrylate, methyl methacrylate, ethyl methacrylate, propyl methacrylate, butyl methacrylate, amyl methacrylate, hexyl methacrylate, 2-ethylhexyl methacrylate, n-octyl methacrylate, decyl methacrylate, lauryl methacrylate, and so on. These monomers can be used singly or in a suitable combination. If necessary, other unsaturated monomers copolymerizable therewith may be employed in combination. Examples of such copolymerizable monomers include styrene and its derivatives, acrylonitrile, methacrylonitrile, acrylic acid, methacrylic acid, vinylpyridine, vinylpyrrolidone, hydroxyalkyl acrylate, acrylamide and its derivatives, methacrylamide and its derivatives, alkylamino acrylate, alkylaminomethacrylate, N,N-dialkylacrylamide, N,N-dialkylmethacrylamide, dimethylaminopropylacrylamide, dimethylaminopropyl- methacrylamide and so on.

The alkali-crosslinkable quaternary ammonium salt monomer of general formula (4) which is to be copolymerized with the above-mentioned alkyl acrylate or alkyl methacrylate is exemplified by the salts of the various epihalohydrin adducts mentioned below with inorganic or organic anions such as the corresponding chlorides, bromides, sulfates, nitrates, acetates, propionates, benzenesulfonates, laurylsulfonates and so on.

Examples of epihalohydrin adduct:

Dimethylaminoethyl methacrylate-epihalohydrin adducts [compounds of general formula (4) wherein $R=CH_3$, $A=-O-$, $n=2$, $R_1$ and $R_2=CH_3$, $X=Cl$, Br or I; the same applies hereunder], diethylaminoethyl methacrylate-epihalohydrin adducts, dimethylaminopropyl methacrylate-epihalohydrin adducts, dimethylaminoethyl acrylate-epihalohydrin adducts, diethylaminopropyl methacrylate-epihalohydrin adducts, dimethylaminoethyl acrylate-epihalohydrin adducts, diethylaminopropyl acrylate-epihalohydrin adducts, dimethylaminopropyl methacrylamide-epihalohydrin adducts, diethylaminopropyl methacrylamide-epihalohydrin adducts, dimethylaminoethylmethacrylamide-epihalohydrin adducts, diethylaminopropylacrylamide-epihalohydrin adducts, dimethylaminopropylacrylamide-epihalohydrin adducts, and so on.

Of the alkali-crosslinkable quaternary ammonium salt monomers of the above general formula (4), the chlorides or nitrates of dimethylaminoethyl methacrylate-epichlorohydrin adduct, dimethylaminoethyl acrylate-epichlorohydrin adduct, dimethylaminopropyl methacrylate-epichlorohydrin adduct, dimethylaminopropylacrylamide-epichlorohydrin adduct and dimethylaminopropylacrylamide-epichlorohydrin adduct are particularly preferred because these monomers are readily available and give acrylic ester resins having satisfactory characteristics.

The compound of general formula (4) is ready to undergo dehalogenation, for example on pH adjustment, to give an epoxy-terminated compound of general formula (5) and this compound of general formula (5) can also be used as said alkali-crosslinkable monomer in the production of the copolymer according to the present invention, either as it is or in combination with the compound of general formula (4). The compound of general formula (5) is generally derived from the compound of general formula (4). However, the use of the epihalohydrin compound of general formula (4) alone is more desirable for purposes of production than the use of the compound of general formula (5) alone or in combination with the compound of general formula (4).

The proportion (copolymerizing amount) of said alkali-crosslinkable quaternary ammonium salt monomer of general formula (4) and/or (5) is preferably such that, by weight, said monomer accounts for 0.5 to 10% of the total monomer used. In this range, the repeating unit of general formula (1), (2) accounts for 0.5 to 10 percent by weight of the total acrylic ester resin. The range of 1 to 7% by weight (the same applies hereinafter) is the more desirable. Thus, if the level is below 0.5%, the density of intergrain, intermolecular and inter-film crosslinks is too low to insure sufficient improvements in the heat-resistant bond strength, aging bond strength and overcoat bond strength mentioned hereinbefore. Conversely, if the level exceeds 10%, the crosslinking density is so high that the resin film tends to become brittle and the above-mentioned adhesive bond strength characteristics are not easily attained.

The copolymerization reaction between said alkali-crosslinkable quaternary ammonium salt monomer and said alkyl (meth)acrylate ester is conducted by the conventional method for production of aqueous acrylic ester copolymer emulsions as mentioned hereinbefore. To be specific, a reactor fitted with a stirrer and a jacket or the like for adjusting the internal temperature is charged with the above monomers and the copolymerization reaction is conducted at atmospheric pressure. The reaction is conducted at the radical-generating temperature of the initiator used, generally at 50° to 80° C., for 3 to 8 hours. For this polymerization reaction, a polymerization initiator, surface active agent, protective colloid, chain transfer agent, buffer, and so on are introduced in the form of an aqueous solution or dispersion into the reaction system.

As said polymerization initiator, generally a peroxide or a combination of a peroxide with a reducing substance is employed. As examples of the peroxide may be mentioned potassium persulfate, sodium persulfate, ammonium persulfate, hydrogen peroxide, and so on. Examples of the reducing substance include acid sodium sulfate, sodium thiosulfate, hydrosulfite, ferrous salts and so on. The proportion of the polymerization initiator is 0.02 to 5 percent based on the total monomer.

The surface active agent may be any of the surfactants used commonly and includes nonionic, anionic and cationic surfactants. However, in the present invention, the use of a nonionic or cationic surfactant is preferred, and the characteristics of the acrylic resin can be best exploited by using such a surfactant. As examples of nonionic surfactants that can be employed, there may be mentioned polyoxyethylene alkyl ether, polyoxyethylene alkyl phenol ether, oxyethylene-oxypropylene block polymer, and so on. The cationic surfactants include, among others, lauryltrimethylammonium chloride, stearyltrimethylammonium chloride, distearyldimethylammonium chloride, alkylbenzyldimethylammonium chloride and so on. Though not so effective as these nonionic and cationic surfactants, anionic surfactants can also be employed. As examples of such anionic surfactants, there may be mentioned higher alcohol sulfate alkali salts and alkylbenzenesulfonic acid alkali salts, alkylnaphthalenesulfonic acid alkali salts, polyoxyethylenealkylsulfate alkali salts, polyoxyethylenealkylphenylsulfate alkali salts, and so on.

As said protective colloid, almost any of the known water-soluble polymers can be utilized. Representative examples of such protective colloid include completely saponified polyvinyl alcohol, partially saponified polyvinyl alcohol, sulfonated partially saponified polyvinyl alcohol alkali salts, sulfonated completely saponified polyvinyl alcohol alkali salts, water-soluble cellulose derivatives such as methylcellulose, hydroxyethylcellulose, etc., polypropylene glycol, polyethylene glycol, and so on. The proportion of said protective colloid is preferably 0.2 to 10 percent, more preferably 2 to 5 percent, based on the total monomer.

The buffer mentioned above may for example be phosphoric acid, sodium hydrogen carbonate, potassium hydrogen carbonate, sodium pyrophosphate, potassium pyrophosphate, sodium orthophosphate, or sodium acetate, and its proportion is 0 to 5 percent based on the total monomer.

In this manner, there is produced an aqueous acrylic ester resin emulsion. In the above emulsion, the acrylic acid ester resin exists as dispersed in particles. The particle size of the resin is preferably controlled within the range of 0.01 to 1 $\mu m$. It is also preferable that the concentration of the acrylic ester resin in the above aqueous emulsion is preferably in the range of 20 to 70% on a solid basis. The acrylic acid ester resin preferably has a glass transition point of $-10°$ C. to 20° C., and more desirably $-5°$ to 5° C. If the glass transition point exceeds 20° C., the skeletal structure of the resin becomes so rigid that the alkali-crosslinking reaction does not proceed smoothly at atmospheric temperature, with the result that the above-mentioned favorable effects on adhesive bond strength cannot be obtained. If, conversely, the glass transition point is less than −10° C., the skeletal structure of the resin becomes so soft that the resin itself has only a low mechanical strength even after the crosslinking reaction has progressed fairly far and, moreover, it becomes difficult to improve the heat-resistant adhesive bond strength. It should be understood that a resin whose glass transition point exceeds 20° C. may be plasticized with a plasticizer so as to reduce its glass transition point or in charging the materials into the reactor for the production of the aqueous emulsion, the (meth)acrylate may be added as a blend with a plasticizer. The plasticizer may be one that is commonly employed, such as dibutyl phthalate, dioctyl phthalate, trimethylpentanediol, trimethylpentanediol monoisobutyrate, trimethylpentanediol diisobutyrate, butylcarbitol and so on. The proportion of the plasticizer is not more than 20 percent based on the acrylic ester resin and is preferably as small as possible.

The concrete structure which is to be coated with said aqueous acrylic acid ester resin emulsion is any and all of the structures made of hydraulic materials such as cement, thus including concrete, lightweight concrete, air-entrained concrete, mortar-finished concrete and other structures; cement mortar and cement resin structures are also included. The finishing material which is applied to said concrete structure through the layer of said aqueous acrylic acid ester resin emulsion is exemplified by cement mortar, cement resin, cement paints, cement stacco and so on. The cement includes portland cement, blast furnace cement, pozzolanic cement, white cement and so on. These cement finishing materials may be supplemented with suitable amounts of aggregates (gravels, riversand, siliceous sand, fine sand, artificial lightweight aggregates, heat-expanding aggregates, etc.), fillers (silica powder, pulp dust asbestos, calcium carbonate, etc.), pigments, air-setting powders (lime, dolomite plaster, etc.), accelerators, retarders, dispersing agents, water-repellent agents, water-reducing agents, aqueous synthetic resin emulsions, and so on.

Using the above-mentioned materials, the present invention may be practiced by the following procedures, for instance. Thus, said aqueous acrylic acid ester emulsion is first applied to the bare surface of the concrete structure. There is no particular limitation on the manner in which the aqueous resin emulsion is applied. Thus, brush coating, roller coating, spray coating and other known coating techniques can be utilized. The concentration of said aqueous emulsion is generally 5 to 50 percent, preferably 10 to 25 percent, based on the total solid or nonvolatile matter. The coverage of said aqueous acrylic ester resin emulsion with respect to the surface area of the concrete structure is 10 to 200 g/m$^2$, preferably 20 to 100 g/m$^2$, and still more desirably 30 to 50 g/m$^2$, based on the solid resin content. If the coverage is less than 10 g/m$^2$, the above-mentioned satisfactory adhesive effect cannot be attained. If, conversely, the coverage of the emulsion exceeds 200 g/m$^2$, the aforesaid alkali-crosslinking reaction in the resin layer is retarded and it tends to take a comparatively long time for the high bond strength to develop. The aqueous acrylic acid ester resin emulsion thus coated on the concrete structure is then subjected to drying. The drying here means substantial drying, and includes semi-drying as well as complete drying. In terms of field workability, this drying is preferably effected by spontaneous drying. By this drying operation, the above emulsion layer is dried to give a dry film.

The completion of this drying can be known by change in appearance of the emulsion film from milk white to substantial transparency. Then, this dried coat film is coated with the cement-based finishing material by a conventional technique such as trowel, spraying or roller coating. In this case, the above-mentioned dried emulsion coat film to be coated with the cement-based finishing material is firmly adhering to the concrete surface through electrical attractive force arising from the cationic property of the acrylic ester resin in the film itself and the anionic property of concrete. When the above cement-based finishing material is applied to said film (overcoating), cement particles having anionic character are adsorbed on the resin film having cationic character. At the same time, the alkali and water contained in the cement-based finishing material penetrate into the resin film and cause the resin film to swell to thereby facilitate alkali crosslinking and further provoke crosslinking of the alkali-crosslinkable functional groups existing in large quantities in the resin coat film. As a result of crosslinking among resin molecules, among resin particles and among resin coat films thus provoked, the resin becomes a kind of thermosetting resin to thereby converts the resin film to a film having high heat resistance, water resistance and strength, and the cured cement-based finishing material layer becomes firmly bound and adherent to the above resin film thanks to the electric attractive force. In this way, the finishing material layer is bonded firmly to the concrete structure, and marked improvements are realized in respect of heat-resistance adhesive strength, durable adhesive strength and atmospheric adhesive strength. The above-mentioned adhesive strength increasing effect is hardly reduced even when repeated or multilayer coating is conducted.

The method of finishing concrete structures according to the invention can realize marked improvements in heat-resistant adhesive strength, durable adhesive strength and atmospheric adhesive strength of the finishing material layer to the concrete structures since the finishing material layer is formed on the bare surface of the concrete structures in the above manner. Furthermore, the method according to the invention produces a very excellent effect in that the adhesive strength hardly decreases even in case of repeated or multilayer application of the aqueous acrylic ester resin emulsion from necessity for the convenience of construction work.

The following embodiment examples and comparative examples are further illustrative of the present invention.

EXAMPLE 1

An emulsion polymerization apparatus (2-liter flask) provided with a stirrer was charged with the materials mentioned below, and an aqueous acylic ester resin emulsion was produced.

Composition of the aqueous solution (1) initially charged:

| | |
|---|---|
| Polyoxyethylene nonylphenyl ether (number of moles of ethylene oxide added: 20) | 4 weight parts |

-continued

| Sulfonated, partially saponifed polyvinyl alcohol sodium salt | 4 weight parts |
| Monosodium phosphate | 0.6 weight part |
| Ammonium persulfate | 0.4 weight part |
| Industrial water | 100 weight parts |
| Total | 109 weight parts |

Composition of the monomer mixture (2):

| Methyl methacrylate | 41 weight parts |
| 2-Ethylhexyl acrylate | 56 weight parts |
| Dimethylaminopropyl methacrylate-epichlorohydrin adduct nitrate (90% aqueous solution) | 3.3 weight parts |

The above aqueous solution (1) in the flask was heated to 75° C. and, then, the above monomer mixture (2) was added dropwise regularly over 3 hours while the temperature was maintained at 75° C. After completion of the dropping, the flask contents were maintained at 75° C. for 1 hour, then cooled and taken out. The aqueous acrylic ester resin emulsion (sample No. 1) thus obtained had the following physical characteristics:

| Solids content | 51% |
| Viscosity (30° C., BH viscometer; hereinafter, the same shall apply) | 260 cps |
| Glass transition temperature (Tg) of the polymer | 0° C. |
| pH | 2.4 |

Then, the above aqueous emulsion was diluted to a solids content of 15% and the dilution was applied to the 7×7 cm surface of a substrate (adherend) 7×7×2 cm in size and made of mortar (cement/sand/water=1/2/0.65; after one month of water curing and the subsequent 2 weeks of atmospheric curing; hereinafter, the same shall apply) in an amount of 25 g (as solids) per square meter. After 2 hours of air drying at 20° C., freshed cement mortar (cement/sand/water=1/2/0.65; hereinafter, the same shall apply) was poured into a formwork fixedly mounted on said substrate to put an extension 4.5×4.5×1 cm in size onto the substrate. Samples produced in this manner were submitted to performance characteristics testing by the methods mentioned below. The results thus obtained are shown in Table 1.

[Normal temperature (atmospheric) adhesive strength]

The sample was cured in wet atmosphere at 20° C. for 1 week and then air-cured for 3 weeks. A copper pulling jig was attached to the cement mortar extention with an epoxy adhesive and the tensile adhesive strength between the substrate and the mortar extension was measured on a tensile tester in a constant-temperature room maintained at 20° C.

[Durable adhesive strength]

The sample was cured in wet atmosphere at 20° C. for 1 week and, then, heated in a drier maintained at 80° C. for 24 hours, immersed in water at about 20° C. for 24 hours and stored in a refrigerator maintained at −10° C. for 24 hours. This heating-immersion-cold storage cycle was repeated 10 times in all. The sample was further subjected to indoor atmospheric curing for 1 week and tested for tensile adhesive strength in a constant-temperature room maintained at 20° C.

[Heat-resistant adhesive strength]

The sample was cured under the same conditions as used in the above normal temperature adhesive strength testing. A steel pulling jig was attached to the mortar extension and the whole was stored in a drier maintained at 55° C. for 24 hours, then taken out from the drier and immerdiately tested for tensile strength.

For comparison, the below three commerical aqueous polymer emulsions for use as mortar primers were applied to the same substrate as used above, followed by placing of the each cement mortar mentioned above for extension formation. The samples thus obtained were tested for tensile adhesive strength under the same conditions as above. The results obtained are also shown in Table 1.

A: Aqueous styrene-2-ethylhexyl acrylate copolymer emulsion; solids content 45%, viscosity 200 cps, Tg −5° C., pH 8.2;

B: Aqueous ethylene-vinyl acetate copolymer-styrene-butyl acrylate Mixed (1:1); copolymer emulsion; solids content 45%, viscosity 360 cps, Tg 0° C., pH 5.3;

C: Aqueous ethylene-vinyl acetate copolymer emulsion; solids content 43%, viscosity 710 cps, Tg −2° C., pH 5.2.

TABLE 1

| Aqueous polymer emulsion | Tensile adhesive strength (kg/cm²) | | |
| --- | --- | --- | --- |
| | Atmospheric | Durability | Heat resistance |
| Sample No. 1 according to the invention | 17.9* | 16.1* | 10.4* |
| Commercial product A | 16.2* | 8.2 | 3.4 |
| Commercial product B | 17.5* | 9.0 | 3.1 |
| Commercial product C | 19.0* | 3.5 | 4.8 |
| No adhesive | 3.6 | 0.8 | 3.2 |

Note:
The asterisk (*) indicates that the breakage was due to cohesive failure in the mortar extension with partial interfacial failure. The absence of the asterisk indicates that the breakage was due to interfacial failure.

The results given in Table 1 indicate that the use of the aqueous acrylic ester resin emulsion according to the invention as the adhesive results in excellent adhesion, good normal temperature adhesive strength, good durable adhesive strength and good heat resistant adhesive strength.

EXAMPLE 2

The same aqueous emulsion as used in Example 1 was diluted with water to a solids content of 20%. The dilution was applied to the surface of a mortar substrate 7×7×2 cm in size in an amount of 32 g (as solids) per square meter and, after air drying at 20° C. for 15 minutes, again applied onto the first coat layer to a total coating weight of 43 g (as solids) per square meter. After air drying at 20° C. for 5 hours, fresh cement mortar was placed on the coat layer to give an extension of 4.5×4.5×1 cm in size. The samples obtained in this manner were tested for normal temperature adhesive strength, durable adhesive strength and heat-resistant adhesive strength under the same conditions as used in Example 1. The results obtained are shown in Table 2.

TABLE 2

| Aqueous polymer emulsion | Tensile adhesive strength (kg/cm²) | | |
|---|---|---|---|
| | Atmospheric | Durability | Heat resistance |
| Sample No. 1 according to the invention | 13.4* | 10.3* | 8.9 |
| Commercial product A | 9.8 | 3.8 | 2.6 |
| Commercial product B | 7.6 | 4.2 | 2.4 |
| Commercial product C | 10.4* | 0.7 | 3.1 |

Note:
The asterisk (*) indicates that the breakage was due to cohesive failure in the mortar extension with partial interfacial failure. The absence of the asterisk indicates that the breakage was due to interfacial failure.

From the results shown in Table 2, it is apparent that the aqueous acrylic ester resin emulsion according to the invention gives good normal temperature adhesive strength, good durable adhesive and good heat-resistant adhesive strength without causing substantial decrease in adherence even after recoating such as mentioned above.

EXAMPLE 3

The same aqeuous emulsion as used in Example 1 was diluted with water to a solids contents of 15% and the dilution was applied to the 7×7 cm surface of an ALC substrate (adherend; commercial product having a specific gravity of 0.6) 7×7×4 cm in size in a coating weight of 50 g per square meter. After air drying at 20° C. for 24 hours, a mortar extension was provided and the whole was tested for tensile adhesive strength. The results are shown in Table 3

TABLE 3

| Aqueous polymer emulsion | Tensile adhesive strength (kg/cm²) | | |
|---|---|---|---|
| | Atmospheric | Durability | Heat resistance |
| Sample No. 1 according to the invention | 7.2** | 6.5** | 4.2 |
| Commercial product A | 5.0* | 4.1* | 0.7 |
| Commercial product B | 5.4* | 3.7 | 1.0 |
| Commercial product C | 5.0* | 2.0 | 0.5 |

Note:
The double asterisk (**) indicates that the breakage was due to cohesive failure in the adherend (ALC).
The asterisk (*) indicates that the breakage was due to cohesive failure in the adherend (ALC) with partial interfacial failure. The absence of the asterisk indicates that the breakage was due to interfacial failure.

The results given in Table 3 show that even when the substrate concrete structure is an ALC having a low alkali content, good adhesive effect can be obtained by using the aqueous acrylic ester resin emulsion according to the invention.

EXAMPLE 4

Aqueous emulsions were produced in the same manner as in Example 1 except that the aqueous solution initially charged into the flask had the below composition and that the composition of the monomer mixture subjected to polymerization was varied as indicated in Table 4 given later herein. Their physical characteristics were as shown in Table 4.

Composition of the aqueous solution initially charged into the flask:

| | |
|---|---|
| Polyoxyethylene octylphenyl ether (number of moles of ethylene oxide added: 35) | 5 weight parts |
| Polyoxyethylene nonylphenyl ether (number of moles of ethylene oxide added: 15) | 5 weight parts |
| Monopotassium phosphate | 1 weight part |
| Potassium persulfate | 0.5 weight part |
| Industrial water | 100 weight parts |
| Total | 111.5 weight parts |

In table 4, the samples marked with a circle before the sample number are aqueous emulsions according to the invention while those with no such mark are aqueous emulsions for comparison. In said table, DMAEMA.Epi stands for dimethylaminoethyl methacrylate-epichlorohydrin adduct, AA for acrylic acid, GMA for glycidyl methacrylate, DMAEA for dimethylaminoethyl acrylate, DMAPAm for dimethylaminopropylacrylamide, DMAEMAAm.Epi for dimethylaminoethylmethacrylamide-epichlorohydrin adduct and DMAPMAAm.Epi for dimethylaminopropylmethacrylamide-epichlorohydrin adduct.

TABLE 4

| Sample No. | Monomer mixture composition (parts by weight) | | | | | Physical characteristics of product emulsion | | | |
|---|---|---|---|---|---|---|---|---|---|
| | DMAEVA · Epi chloride 90% aqueous solution | Methyl methacrylate | Butyl acrylate | 2-Ethylhexyl acrylate | Another monomer | Solids content (%) | Viscosity (cps) | T g (°C.) | pH |
| 2 | 0 | 44 | 56 | — | — | 50.3 | 260 | 1 | 2.3 |
| ○ 3 | 0.55 | 43.5 | 56 | — | — | 50.6 | 280 | 1 | 2.2 |
| ○ 4 | 1.1 | 43 | 56 | — | — | 50.8 | 250 | 0 | 2.1 |
| ○ 5 | 3.3 | 41 | 56 | — | — | 50.4 | 270 | −1 | 2.2 |
| ○ 6 | 8.8 | 36 | 56 | — | — | 50.2 | 280 | −2 | 2.3 |
| ○ 7 | 11.0 | 34 | 56 | — | — | 50.7 | 310 | −3 | 2.4 |
| 8 | 13.3 | 32 | 56 | — | — | 51.0 | 290 | −4 | 2.2 |
| ○ 9 | 4.4 | 44 | — | 52 | — | 50.7 | 270 | 0 | 2.3 |
| ○ 10 | 4.4 | — | 56 | — | Styrene 40 | 50.8 | 610 | −1 | 2.0 |
| 11 | 4.4 | 30 | 66 | — | — | 50.7 | 280 | −15 | 2.1 |
| 12 | 4.4 | 54 | 42 | — | — | 50.5 | 270 | 25 | 2.6 |
| 13 | — | 46 | — | 53 | AA 1 | 50.3 | 310 | −2 | 2.3 |
| 14 | — | 39 | 57 | — | GMA 4 | 50.7 | 400 | −1 | 2.4 |
| 15 | — | 39 | 57 | — | DMAEA 4 | 50.2 | 180 | −4 | 2.3 |

TABLE 4-continued

| | | Monomer mixture composition (parts by weight) | | | | Physical characteristics of product emulsion | | | |
|---|---|---|---|---|---|---|---|---|---|
| Sample No. | DMAEVA·Epi chloride 90% aqueous solution | Methyl methacrylate | Butyl acrylate | 2-Ethylhexyl acrylate | Another monomer | Solids content (%) | Viscosity (cps) | Tg (°C) | pH |
| 16 | — | 39 | 57 | — | DMAPAm 4 | 50.6 | 200 | −2 | 2.4 |
| O 17 | DMAEMA·Epi nitrate 90% aqueous solution 4.4 | 44 | — | 52 | — | 50.4 | 210 | 0 | 2.1 |
| O 18 | DMAEMAAm·Epi chloride 90% aqueous solution 4.4 | 39 | 57 | — | — | 50.5 | 320 | −2 | 2.0 |
| O 19 | DMAPMAAm·Epi chloride 90% aqueous solution 4.4 | 40 | 56 | — | — | 50.1 | 260 | −1 | 2.2 |

The aqueous emulsions obtained were each diluted to a solids content of 15%. Each dilution was applied to the surface of a mortar substrate (adherend) 7×7×2 cm in size in a coating amount of 36 g/m². After air drying at 20° C. for 24 hours, fresh mortar cement was poured onto the coated substrate to give an extension 4.5×4.5×1 cm in size. The samples obtained in this manner were tested for atmospheric adhesive strength, durable adhesive strength and heat-resistant adhesive strength under the same conditions as used in Example 1. The test results obtained are shown in Table 5.

TABLE 5

| Aqueous polymer emulsion sample No. | Tensile adhesive strength (kg/cm²) | | |
|---|---|---|---|
| | Atmospheric | Durability | Heat resistance |
| 2 | 6.0 | 2.1 | 1.0 |
| O 3 | 12.6 | 10.6 | 7.0 |
| O 4 | 14.8 | 11.2 | 8.2 |
| O 5 | 15.1 | 12.6 | 10.6 |
| O 6 | 15.7 | 12.0 | 11.0 |
| O 7 | 16.0 | 11.0 | 11.2 |
| 8 | 11.2 | 9.9 | 6.5 |
| O 9 | 14.0 | 12.4 | 10.6 |
| O 10 | 13.7 | 12.3 | 10.7 |
| 11 | 8.4 | 7.2 | 2.9 |
| 12 | 9.6 | 7.6 | 5.8 |
| 13 | 13.3 | 7.1 | 3.7 |
| 14 | 8.9 | 7.4 | 4.2 |
| 15 | 8.4 | 2.2 | 0.8 |
| 16 | 6.5 | 3.0 | 1.2 |
| O 17 | 14.0 | 11.8 | 10.4 |
| O 18 | 13.1 | 12.0 | 9.9 |
| O 19 | 14.6 | 12.1 | 9.8 |

As is evident from Table 5, the aqueous acrylic ester resin emulsions (emulsions Nos. 3–7, No. 9, No. 10 and Nos. 17–19) are much superior in heat resistant adhesive strength even to the aqueous methyl methacrylatebutyl acrylate-glycidyl methacrylate copolymer emulsion (emulsion No. 14) known as an alkali-crosslinkable emulsion-type adhesive. Said emulsions are satisfactory in every respect, namely in respect of atmospheric adhesive strength, durable adhesive strength and heat resistant adhesive strength.

EXAMPLE 5

The emulsions used in Example 4 were diluted with water to a solids content of 15%. Each dilution was applied to the surface of a mortar substrate (adherend) 7×7×2 cm in size in a coating amount of 27 g (as solids) per square meter (first coating). After air drying at 20° C. for 30 minutes, the same dilution was again applied to a total coating weight of 37 g (as solids) per square meter. After air drying at 20° C. for 16 hours, fresh cement mortar was placed on the coated substrate to give an extension 4.5×4.5×1 cm in size. The samples produced in this manner were tested for atmospheric adhesive strength, durable adhesive strength and heat-resistant adhesive strength under the same testing conditions as used in Example 1. The results obtained are shown in Table 6.

TABLE 6

| Aqueous polymer emulsion sample No. | Tensile adhesive strength (kg/cm²) | | |
|---|---|---|---|
| | Atmospheric | Durability | Heat resistance |
| 2 | 4.0 | 1.0 | 0.5 |
| O 3 | 12.6 | 9.8 | 6.4 |
| O 4 | 13.7 | 10.6 | 7.3 |
| O 5 | 14.1 | 10.7 | 9.9 |
| O 6 | 14.6 | 11.0 | 10.0 |
| O 7 | 13.9 | 10.2 | 10.2 |
| 8 | 8.0 | 5.6 | 3.0 |
| O 9 | 12.9 | 11.6 | 10.1 |
| O 10 | 12.0 | 11.3 | 10.2 |
| 11 | 5.0 | 4.0 | 2.2 |
| 12 | 7.2 | 4.6 | 3.1 |
| 13 | 3.0 | 5.1 | 2.6 |
| 14 | 2.1 | 3.2 | 2.0 |
| 15 | 1.6 | 1.1 | 0.7 |
| 16 | 1.3 | 1.0 | 0.8 |
| O 17 | 13.0 | 10.8 | 10.3 |
| O 18 | 12.0 | 10.6 | 9.2 |
| O 19 | 11.9 | 9.8 | 9.0 |

Comparison between Table 6 and Table 5 clearly shows that while repeated coating with the known aqueous acrylic ester copolymer emulsions in the manner mentioned above results in marked decrease in adherence (atmospheric adhesive strength, durable adhesive strength, heat-resistant adhesive strength), the aqueous acrylic ester resin emulsions according to the invention do not cause substantial decrease in adherence but give good results with respect to atmospheric adhesive strength, durable adhesive strength and heat-resistant adhesive strength even when they are applied repeatedly.

What is claimed is:

1. A method of finishing a concrete structure, which comprises the steps of: (a) coating an aqueous synthetic resin emulsion on the bare surface of a concrete structure, (b) substantially drying the film formed by the emulsion, and (c) forming a cement-based finish layer predominantly made up of cement and water on top of the dried emulsion film; wherein the aqueous synthetic resin emulsion is an acrylic ester copolymer comprising either one or both of a repeating unit of formula I

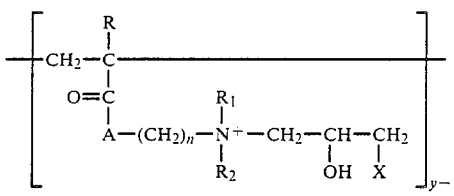

and a repeating unit of formula II

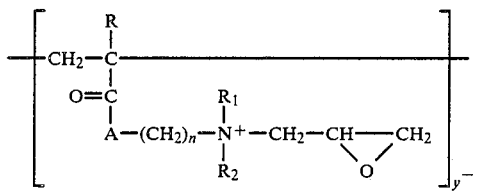

and a repeating unit of formula III

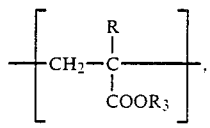

the copolymer having a glass transition point in the range of $-10°$ C. to $20°$ C.; where R is a hydrogen atom or a methyl group; $R_1$ and $R_2$ may be the same or different and are a methyl group or an ethyl group; $R_3$ is a $C_1$-$C_{12}$ alkyl group or a cycloalkyl group; A is —O— or —NH—, X is chlorine, bromine, or iodine; Y is an organic or inorganic anion; and n is 2 or 3.

2. The method of claim 1, wherein at least one of the repeating units of formula I and that of formula II occurs in an amount of about 0.5 to 10% by weight based on the whole acrylic ester copolymer.

3. The method of claim 1, wherein the aqueous acrylic ester resin emulsion is applied in a coating weight of about 10–200 g/m² on the solids basis.

4. The method of claim 2, wherein the aqueous acrylic ester resin emulsion is applied in a coating weight of about 10–200 g/m² on the solids basis.

* * * * *